Jan. 6, 1970 W. BECKER ET AL 3,487,502
PRODUCTION OF METAL GRANULES
Filed Aug 28, 1967 2 Sheets-Sheet 1

INVENTOR.
Wilhelm Becker et al
BY
Attorneys

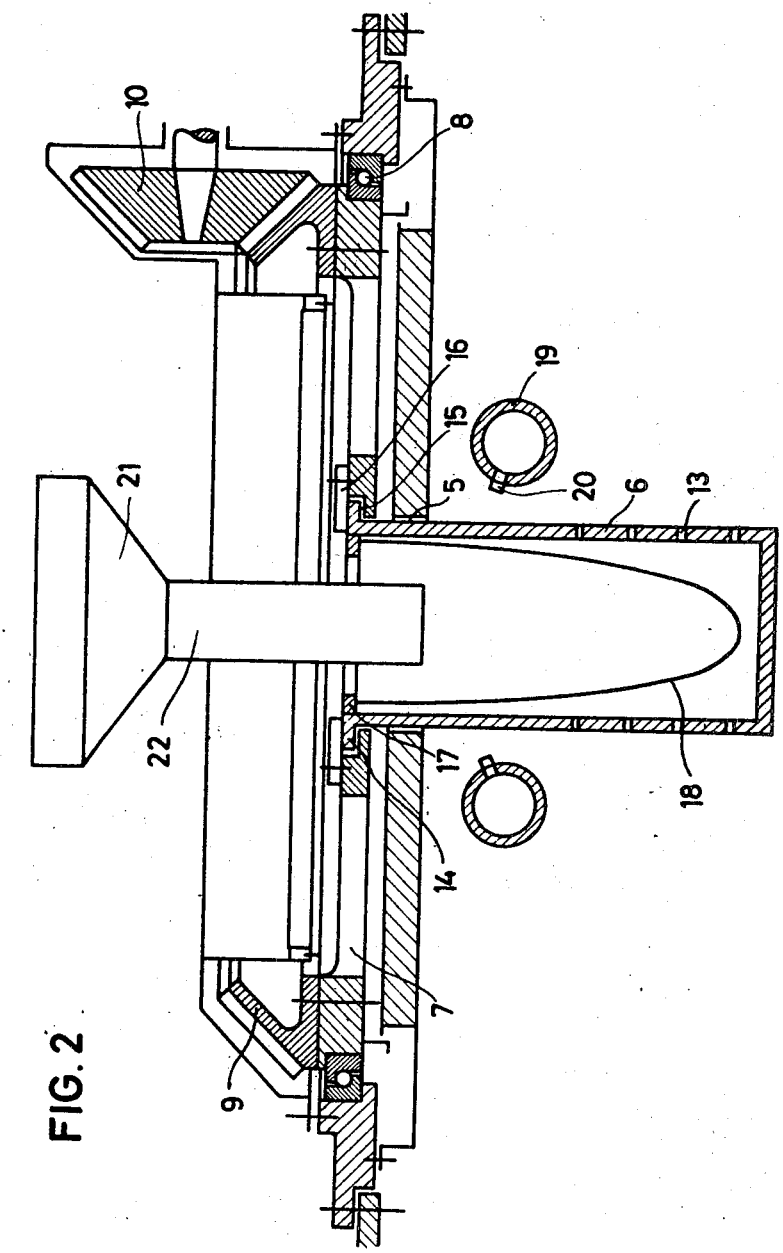

United States Patent Office 3,487,502
Patented Jan. 6, 1970

3,487,502
PRODUCTION OF METAL GRANULES
Wilhelm Becker, Dusseldorf-Oberkassel, and Clemens Heumann, Neviges, Germany, assignors to Schloemann Aktiengesellschaft, Dusseldorf, Germany, a company of Germany
Filed Aug. 28, 1967, Ser. No. 663,614
Claims priority, application Germany, Aug. 31, 1966, Sch 39,478
Int. Cl. B29c 5/04
U.S. Cl. 18—2.6    5 Claims

ABSTRACT OF THE DISCLOSURE

A method and means for the production of metal granules by continuously pouring molten metal into a rotating perforated screening pot freely suspended from above and driven from above, the screening pot being provided with a central filling aperture and with lateral screening apertures, through which the molten metal is centrifuged into a cooling vessel located beneath it, which is completely free from internal obstructions.

---

Figure 1:
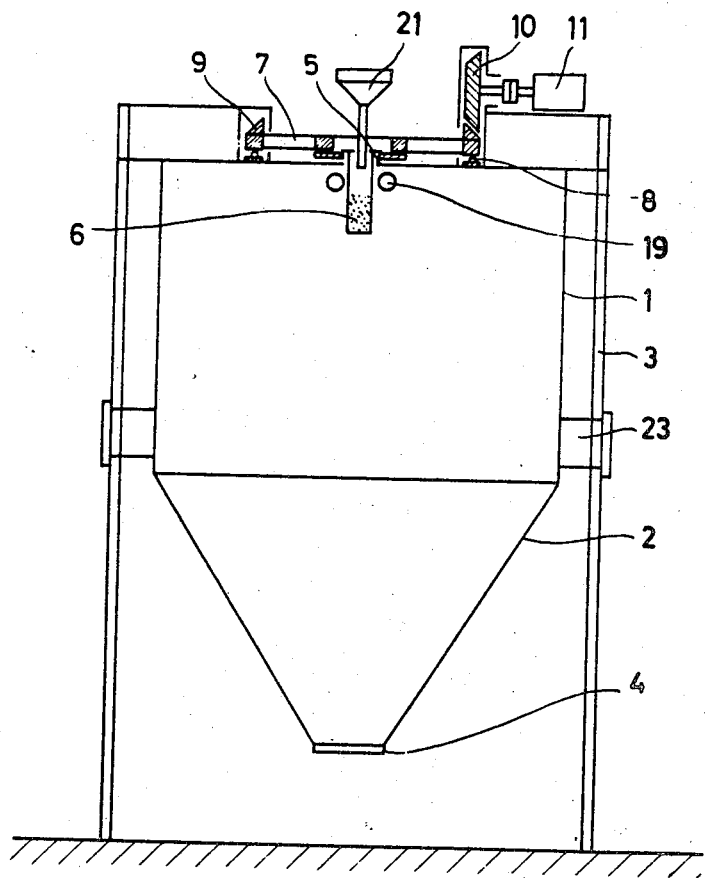

This invention relates to a process and apparatus for the production of metal granules from molten metal, which is filled into a rotating screening pot.

In the case of a known device of this kind, the screening pot is mounted upon a tower supported within a cooling vessel, and is driven from below. Since in this case the supplying of energy and of cooling water to the driving unit has to be passed through the tower, the servicing and maintenance of the apparatus are very difficult. In particular, however, the tower carrying the screening pot, and its supporting means within the cooling vessel, have a disadvantageous effect upon the granulate produced; for owing to these fittings provided inside the cooling vessel it is not possible for the centrifuged granules to pass unhindered through the cooling vessel to the discharge aperture thereof. Some of them strike instead either upon the tower itself or upon its supporting struts, and may there, above all when still in a hot condition, become welded to one another, or else to the said fittings. Even in a cold condition the granules, perhaps with slight deformation, may at these places become entangled with one another, so that undesirable conglomerations are frequently produced. These in their turn tend to form arched bridges inside the cooling vessel, so that the uniform discharge of the granulated material is disturbed. It therefore frequently becomes necessary to interrupt the centrifuging in order to destroy the bridges formed, and to enable the granulated material thus loosened to be discharged. A continuous method of working is therefore not ensured with sufficient certainty. A further disadvantage resides in the fact that the screening pot, on account of its method of securing being difficult of access, cannot be exchanged with the speed and reliability requisite for practical operation.

The present invention is based upon the problem of supplementing a method and a device of the kind hereinbefore described in such a way that the aforementioned disadvantages cannot arise. In particular, it aims at providing a continuous method of working, wherein a uniform granular material accrues, which can be discharged without disturbance. This is substantially attained, according to the invention, by the fact that the molten metal is filled from above into a screening pot driven above its screening apertures, and that the granules, after their discharge, in free parabolic fall, enter a cooling vessel extending underneath the screening pot and free from inserted fittings, and are drawn off after their solidification.

The apparatus provided for carrying out this process is essentially characterised by the feature that the screening pot is freely suspended from above in the cooling vessel, and is provided with a central filling aperture for the molten metal.

The screening pot may conveniently be mounted in a bearing body concentrically surrounding it, which is rotatably supported with a portion remote from the screening pot, and is so designed that the part located between the bearing and the screening pot opposes considerable thermal resistance to the heat emanating from the screening pot.

In this way a continuous method of operation in the production of granules is ensured, since the granules produced can be discharged without disturbance. For maintenance and servicing purposes the plant is readily accessible, whereby lengthy interruptions of operation are obviated. Another important point is the reduction in the cost and the weight of the plant, attained by the absence of the tower and its supports. The granules produced cannot become either welded together or mechanically interlocked in the cooling vessel, which is free from inserted fittings, and in particular, also, cannot lead to the formation of arches, by which the continuous discharge of the granules might be disturbed.

Further features of the invention will now be described with reference to the accompanying drawings, which relate to a constructional example, in which:

FIGURE 1 shows a cross-section through the casting or pouring apparatus as a whole; and FIGURE 2 shows on a larger scale upper part of the casting apparatus of FIGURE 1, likewise in cross-section.

The casting apparatus consists essentially of a cylindrical jacket-like cooling vessel 1, which is suspended in a frame 3, and is of funnel-shaped construction in its lower portion 2. This receiving funnel 2 terminates at the bottom with a discharge aperture 4. The cooling vessel 1 is further provided with a central aperture 5 at the top, in which a screening pot 6 is suspended. The screening pot 6 is in its turn inserted centrally in a disc-shaped bearing body 7, which is carried, in the neighbourhood of its outer periphery, by a ball or roller bearing 8. The bearing body 7 is driven by way of its outer periphery. In the constructional example illustrated, the outer periphery is provided with disc-wheel teeth 9, which mesh with a driving bevel wheel 10. The latter is coupled to the driving shaft of a motor 11.

The disc-like construction of the bearing body 7 serves the purpose of opposing as great a thermal resistance as possible to the heat emanating from the screening pot 6. This aim could obviously also be attained if the bearing body extended not in a horizontal direction, as in the constructional example illustrated, but in a vertical direction, and was itself of pot-like construction for example. It might likewise be constructed with an annular intermediate section consisting of a material which is a particularly poor conductor of heat.

The screening pot 6 is of cylindrical construction, and is closed at the bottom. It is made of a material of sufficient strength at the particular pouring temperature of the metal to be granulated, and of sufficient resistance to any tendency to corrode. It may be of cast iron, for instance, in the production of aluminium granules, or of a fireproof material in the production of steel granules. Its lower portion is provided with screening apertures 13, through which the molten metal is centrifuged. At its upper edge the screening pot 6 has an external flange 14, which holds it in a suitable central aperture in the bearing body 7. This flange preferably rests upon an annular disc or ledge 15, and is secured thereto by upper clamping elements 16. The upper edge of the screening pot 6 is furthermore provided with an inner collar 17, the internal diameter of which is smaller than that of the paraboloid of revolution forming during the rotation of the molten metal. The screening pot 6 can thereby be made comparatively short, and operated at a high speed of revolution, without the molten metal escaping over its upper edge.

Since the molten metal clinging in the upper portion of the screening pot 6, in consequence of its rotation, and assuming the paraboloidal surface marked 18, readily cools down, and may thus solidify, an annular heating means 19 is provided for this portion of the screening pot. In the embodiment illustrated this heating means consists of an annular gas pipe, into which a number of nozzles 20 directed towards the screening pot are fitted. In this way the whole of the metal melt in the screening pot 6 is successfully maintained in a liquid condition.

The molten metal is supplied to the screening pot by way of a pouring funnel 21. The latter projects with its discharge nozzle 22 into the screening pot 6, so that even when the pouring jet is disturbed, any splashes of metal are caught in the screening pot 6.

The jets of metal issuing from the screening pot 6 through its screening apertures 13 have a parabolically curved path of flight, and cool down on this flight to such an extent that they are already solidified when they impinge upon the conical surface of the catch funnel 2. It is important, however, that throughout their flight they should not come into contact with any obstructions, which might in the manner already described, cause weldings or interlockings of the individual granules with one another, or arch-like formations. In the cooling vessel 1, lateral air inlet and outlet apertures 23 are provided, which are equipped with suitable closing means, not shown.

A special advantage of the apparatus according to the invention consists in the feature that the screening pot 6 admits of being easily taken out of the bearing body 7 in an upward direction, and can therefore be quickly and easily exchanged for another one.

The method of working will now be described with reference to the following example:

A melt consisting of 99.5 percent aluminium was first heated to a casting temperature of 730° C. It was then poured into this new casting device. The screening pot had a wall diameter of 70 mm. and an internal collar diameter of 55 mm. While the molten metal was being poured in its variably adjustable speed of revolution was 1,200 revolutions per minute. The granules obtained in this way had a length of about 5 mm. and a diameter of about 1 mm. They accrued with a particularly uniform size of grain, did not adhere to one another, and admitted of being discharged smoothly.

We claim:

1. Apparatus for producing metal granules from molten metal, comprising: a cooling vessel free from internal obstructions, a laterally perforated screening pot formed with a central aperture in the top for the axial admission of molten metal, and freely suspended from above co-axially in the top of the cooling vessel, a rotatable bearing body formed with a central aperture supporting and concentrically surrounding the screening pot, a bearing, remote from the screening pot, for rotatably supporting the bearing body on the cooling vessel, and driving means for rotating the screening pot from above at a high speed and thereby centrifuging the molten metal, the cooling vessel being of such dimensions, relatively to the screening pot, that the centrifugal metal falls freely into it in parabolic paths.

2. Apparatus for producing metal granules as claimed in claim 1, the part of the bearing body extending between the screening pot and the said bearing being adapted to oppose considerable thermal resistance to the flow of heat from the screening pot.

3. Apparatus for producing metal granules as claimed in claim 2, the said bearing consisting of rolling members, and the said driving means comprising toothed bevel wheels, a motor, a toothed bevel pinion driven by the motor, and bevel teeth on the bearing body meshing with the teeth of the bevel pinion.

4. Apparatus for producing metal granules as claimed in claim 2, the screening pot being cylindrical, and comprising an external flange and an internal collar both around its upper edge, the external flange resting on the margin of the central aperture in the bearing body, and the internal diameter of the internal collar being less than the internal diameter of the upper edge of the paraboloid of revolution formed by tthe molten metal in the screening pot during centrifuging.

5. Apparatus for producing metal granules as claimed in claim 1, further comprising annular heating means arranged around the screening pot and directed towards the part of the periphery of the screening pot above the lateral perforations therein.

References Cited

UNITED STATES PATENTS

| | | | |
|---|---|---|---|
| 65,339 | 6/1867 | Butcher et al. | |
| 809,671 | 1/1906 | Cowing | 18—2.6 |
| 1,498,717 | 6/1924 | Coffin | 18—2.6 X |
| 1,939,391 | 12/1933 | Curran | 18—2.6 X |
| 2,310,590 | 2/1943 | Marette | 18—2.6 X |
| 2,919,184 | 12/1959 | Osswald et al. | 18—2.6 |
| 3,113,062 | 12/1963 | Darnell | 18—2.6 |
| 3,246,982 | 4/1966 | Moritz et al. | 18—2.6 X |
| 3,249,657 | 5/1966 | Russo | 18—2.6 X |
| 3,298,058 | 1/1967 | Summerville | 18—2.6 |

WILLIAM J. STEPHENSON, Primary Examiner